3,755,391
PROCESS FOR THE PRODUCTION OF
MANGANIC CARBOXYLATES
Jean-Noel Marie Bertrand, Tervueren, and Joseph Marie
Vaerman, Brussels, Belgium, assignors to Labofina S.A.,
Brussels, Belgium
No Drawing. Filed Oct. 27, 1971, Ser. No. 193,213
Claims priority, application Belgium, Jan. 4, 1971,
98,261
Int. Cl. C07f 13/00
U.S. Cl. 260—429 R                                    9 Claims

ABSTRACT OF THE DISCLOSURE

A process for the production of the manganic salt of an aliphatic carboxylic acid, which comprises treating in liquid phase by an oxygen containing gas, a manganous compound from the group consisting of manganous salt of said carboxylic acid, a manganous salt of a weaker than said carboxylic acid, manganous oxide and manganous hydroxide, in the presence of a ketone having the formula R—CO—$R_1$, wherein R is an aliphatic or aromatic radical and $R_1$ is an aliphatic radical or forms with R a cycloalkane radical, and in the presence of said carboxylic acid of which said manganic salt is a derivative, at a temperature from 50 to 130° C.

---

This invention relates to a process for the production of manganic carboxylates, and more particularly, the present invention relates to a process for the production of manganic salts of aliphatic carboxylic acids where the manganese has a valency of three.

Many processes are known for the liquid phase oxidation of various organic compounds, for example of ketones into aliphatic acids, of aromatic hydrocarbons into aromatic aldehydes, etc., in the presence of manganic carboxylates.

Recently, however, the manganic salts which were employed at very low concentrations as catalysts for these liquid phase oxidation reactions have received a new application, not as a catalyst, but as an oxidizing agent used in stoichiometric amount. So in Belgian Pat. No. 727,874, there is described the selective oxidation under a nitrogen atmosphere and by manganic acetate of ethylbenzene into methylphenylcarbinol acetate with a selectivity of 93%. Toluene is oxidized into benzyl acetate by the same process. Large amounts (at least stoichiometric) of manganic acetate are used with these processes. For the industrial development of these processes, employing stoichiometric quantities of the manganic carboxylates, the manganic carboxylates must be easily obtained in the active state and, moreover, must be maintained in this state during the oxidation reaction, in order to have a rapid and efficient reaction and to reduce the operating costs.

The known processes for the production of manganic carboxylates are relatively expensive due to the complexity of the known methods, the price of the reactants and/or the difficulties encountered to obtain the manganic carboxylate in a relatively pure form. Moreover, these processes cannot be applied to regenerate manganic carboxylates in the course of oxidation reactions during which these manganic salts are reduced into the corresponding manganous salts. Therefore, for industrial purposes, there is a definite need for an easy and efficient process for the production of manganic carboxylates from manganous compounds, the term "production" relating both to the manufacture and the regeneration of manganic carboxylates.

It is an object of the present invention to provide a new process for the production of manganic carboxylates. Another object of the present invention is to provide a new process for the production of manganic salt of an aliphatic carboxylic acid.

The present invention is a process for the production of the manganic salt of an aliphatic carboxylic acid which comprises treating in liquid phase by molecular oxygen or an oxygen containing gas, a manganous compound from the group consisting of the manganous salt of said carboxylic acid, the manganous salt of an acid which is weaker than said carboxylic acid, manganous oxide and manganous hydroxide, in the presence of a co-oxidable ketone having the formula R—CO—$R_1$ where R is an aliphatic or aromatic radical and $R_1$ is an aliphatic radical or forms together with R a cycloalkane radical, and in the presence of said carboxylic acid of which manganic salt is a derivative, at a temperature from 50 to 130° C. The term "manganic salt of carboxylic acid" relates not only to such salts in pure state but also, to manganese salt containing mixtures having a major proportion of said manganic salt.

The present invention also may be applied for regenerating manganese salts which are used in many oxidation reactions. This regeneration may be performed by withdrawing continuously or intermittently part of the manganese carboxylate which is then treated separately by the process of this invention to convert it or enrich it into manganic carboxylate which is then recycled to the reaction mixture. Another embodiment of the present invention which is particularly advantageous comprises performing the regeneration of the manganese carboxylate in the course of the oxidation reaction of an organic compound by continuously or intermittently adding the ketone (as defined above) during the reaction.

The manganous compound is converted into the manganic salt of a carboxylic acid by co-oxidation with the above defined ketone in the presence of the carboxylic acid of which the manganic salt produced is a derivative. The ketones useful include a wide range of compounds and may include saturated or olefinic aliphatic ketones, such as acetone, methylethylketone, heptanone, undecanone, mesityl oxide, or cyclic ketones, such as cyclohexanone, or aromatic ketones such as acetophenone. Generally, the ketone is one containing no more than 12 carbon atoms. The choice of the particular ketone depends not only on its influence on the reaction rate during the manufacture or the regeneration of the manganic carboxylate, but also on economic factors. In this respect, acetone is advantageous but other compounds may be useful, taking into account the price of the acid which is derived from the ketone during the production of the manganic salt.

The temperature of the reaction for the production of the manganic carboxylate may vary within wide limits. Generally, such temperature is between about 50° and 130° C., depending on the reactivity and the volatility of the ketone employed. In most instances, a temperature between 60° C. and 100° C. will be employed. Any of the co-oxidation compound, the ketone, which is evolved due to the reaction temperature and the stripping action of the oxygen containing gas may be condensed and recycled to the reaction mixture by means of any convenient device. These temperatures are based on atmospheric pressure operation, it being understood that such temperatures will be higher when working under elevated pressures.

The conversion of the manganous compound into manganic carboxylate by the process of this invention is carried out in the presence of a gaseous phase containing molecular oxygen. This gaseous phase may consist of pure oxygen or of a mixture of oxygen with other gases which are inert in the reaction conditions; for example, air may be used. The partial pressure of oxygen may be between 0.1 and 50 atmospheres, and more particularly, between 0.2 and 10 atmospheres.

The yield of the reaction for the production of manganic carboxylate depends largely on the degree of contact between the gaseous and the liquid phases and an intimate contact between these two phases is secured by any known device. For example, stirring, circulation of liquids, etc., may be employed.

In order that the production of manganic carboxylate may be carried out in liquid phase, generally, use is made of a solvent which is substantially inert to the reaction under the conditions employed and in which the manganic carboxylate and the starting manganous compound are soluble or readily dispersible. The solvent is preferably the carboxylic acid corresponding to the manganic carboxylate to be prepared. When the starting manganous compound is only partially soluble in the reaction mixture, it must be finely dispersed in this mixture by effective stirring. The use of an additional solvent is not required when the process of this invention is applied for the regeneration "in situ" of the manganic carboxylate in the course of oxidation reactions in the liquid phase where the solvent is the acid corresponding to the carboxylate.

The amount of co-oxidable ketone to be used depends on the amount of manganic carboxylate which it is desired to produce. Preferably, at least 0.5 mole of the ketone is used for each mole of manganic carboxylate to be prepared. The production rate of the manganic carboxylate depends on the concentration of the ketone in the reaction mixture. For the manufacture of manganic carboxylate, it is therefore advantageous to charge at once at the start of the reaction all of the required amount of the ketone.

The process of the present invention contrasts with prior processes which are used for the regeneration of other metal salts, such as of cobalt salts, with a ketone of an aldehyde, where the latter must be introduced progressively into the reaction mixture. A massive, one time, addition of ketone or aldehyde does not permit a substantial amount of cobalt salt to be regenerated. Also, acetaldehyde and benzaldehyde do not convert manganous carboxylate into a manganic carboxylate. To the contrary, these aldehydes are particularly suitable only for regenerating cobaltous salts into the corresponding cobaltic salts.

Following completion of the reaction for the production of manganic carboxylate, the reaction mixture is cooled and/or the eventual excess of ketone is distilled off, so as to avoid any further oxidation of the ketone by the produced manganic carboxylate. The ketone being eliminated, the manganic carboxylate generally is in solution in the carboxylic acid used as solvent and this solution may be employed directly for many oxidation reactions. Where a manganic carboxylate in powder form is desired, the solvent may be removed by conventional methods.

The above features and other characteristics and advantages of the process of the present invention will be rendered more apparent by the following examples which are merely illustrative and are not limiting.

EXAMPLE 1

A one-litre reactor was charged with 500 ml. of a mixture obtained by adding 0.2 mole of manganous acetate to anhydrous acetic acid. The mixture was heated up to 70° C. under a stream of oxygen. Then 0.15 mole of acetone per hour per litre of reaction mixture was added while stirring.

The unconverted and stripped acetone was recovered at the outlet by means of a trap cooled with Dry Ice.

The formation of the manganic salt was followed during course of the reaction by sampling of the reaction mixture, reducing the manganic ions by a solution of ferrous salt having a known titer and then determining the excess of ferrous salt by a standard solution of potassic bichromate.

The formation of manganic salt in the manganese carboxylate (the percentage of manganic carboxylate calculated on the total amount of manganic and manganous carboxylates) as a function of the reaction time was the following:

| Hours: | Percent |
|---|---|
| 0 | 0 |
| 1 | 1.0 |
| 2 | 8.0 |
| 3 | 32.5 |
| 4 | 50.0 |
| 5 | 70.0 |
| 6 | 86.0 |
| 6⅓ | 100.0 |

EXAMPLE 2

The operation of Example 1 was substantially repeated with the exception that manganous propionate and propionic acid was used instead of manganous acetate and acetic acid.

Formation of manganic propionate was as follows:

| Hours: | Percent |
|---|---|
| 0 | 0 |
| 1 | 1.6 |
| 2 | 3.9 |
| 3 | 8.3 |
| 4 | 16.7 |
| 5 | 42.2 |
| 6 | 81.0 |
| 6¾ | 100.0 |

EXAMPLE 3

A one-litre reactor was charged with 500 ml. of a mixture obtained by adding 0.2 mole of manganous acetate to anhydrous acetic acid. The mixture was heated up to 60° C. under a stream of oxygen and 0.60 mole of acetone was added at once.

The unconverted and stripped acetone was condensed at the outlet of the reactor in a trap cooled with Dry Ice and was recycled into the reaction mixture.

The formation of manganic acetate as a function of the reaction time, determined as in Example 1, was as follows:

| Hours: | Percent |
|---|---|
| 0 | 0 |
| 1 | 29.5 |
| 2 | 65.3 |
| 3 | 91.6 |
| 3¼ | 100.0 |

The comparison between this Example 3 and Example 1 shows that the production rate of manganic carboxylate is substantially enhanced by an initial high concentration of acetone.

EXAMPLE 4

A one litre reactor was charged with 500 ml. of a mixture obtained by adding 0.2 mole of manganous acetate to anhydrous acetic acid. The mixture was heated up to 70° C. under a stream of oxygen and 0.40 mole of 2-heptanone was added at once.

The formation of manganic acetate as a function of the reaction time, determined as in Example 1, was as follows:

| Hours: | Percent |
|---|---|
| 0 | 0 |
| 1 | 43.7 |
| 2 | 80.0 |
| 2¼ | 100.0 |

EXAMPLE 5

A one-litre reactor was charged with 500 ml. of a solution of 0.2 mole manganic acetate in anhydrous acetic acid. This solution was heated up to 90° C. under a stream of oxygen and 0.05 mole of 4-oxopentanoic acid added at once. Then 0.05 mole/hr. of this compound was added thereafter.

The 4-oxopentanoic acid was oxidized into succinic acid.

After two hours, there remained 8.5% of the initial manganic ions.

By contrast, when operating in the same manner except by adding ot the 4-oxopentanoic acid an equivalent amount of acetone, it was observed that after two hours of reaction, 76% of the initial manganic ions were still present.

From this, it is seen that the process of the present invention allows regeneration "in situ" of a manganic salt during the course of a reaction.

EXAMPLE 6

Manganese acetate whose concentration as manganic salt was lowered to 45% was regenerated by introducing into a one litre reactor a mixture obtained by adding 0.2 mole of this acetate to anhydrous acetic acid. The mixture was heated up to 70° C. under a stream of oxygen and 0.15 mole of cyclohexanone per hour per litre of reaction mixture was added.

The reformation of manganic acetate as a function of the reaction time, determined as in Example 1, was as follows:

| Hours: | Percent |
|---|---|
| 0 | 45.0 |
| 1 | 57.5 |
| 2 | 71.0 |
| 3 | 79.0 |

EXAMPLE 7

A one-litre reactor was charged with 500 ml. of a mixture obtained by adding 0.2 mole manganous acetate to anhydrous acetic acid. The mixture was heated up to 70° C. under a stream of oxygen and 0.56 mole mesityl oxide was introduced at once.

The formation of manganic acetate as a function of the reaction time was the following:

| Hours: | Percent |
|---|---|
| 0 | 0 |
| 1 | 28.2 |
| 2 | 73.9 |
| 3 | 91.0 |
| 4 | 94.1 |

EXAMPLE 8

A one-litre reactor was charged with 500 ml. of a mixture obtained by adding 0.2 mole of manganous acetate to anhydrous acetic acid. The mixture was heated up to 70° C. under a stream of oxygen and 0.55 mole of acetophenone were introduced at once.

The formation of manganic acetate as a function of the reaction was the following:

| Hours: | Percent |
|---|---|
| 0 | 0 |
| 1 | 43.1 |
| 2 | 97.8 |
| 2¼ | 100.0 |

EXAMPLE 9

The operation of Example 8 was repeated but by substituting manganous carbonate for manganous acetate.

This carbonate was converted into magnanic acetate in 2 hours 30 minutes.

EXAMPLE 10

The operation of Example 8 was repeated but by substituting manganous oxide for manganous acetate.

This oxide was converted into manganic acetate in 3 hours 10 minutes.

What is claimed is:

1. A process for the production of the manganic salt of an aliphatic carboxylic acid, which comprises treating in liquid phase by an oxygen containing gas, a manganous compound from the group consisting of manganous salt of said carboxylic acid, a manganous salt of a weaker than said carboxylic acid, manganous oxide and manganous hydroxide, said manganous compound being present in substantially greater than catalytic amounts, in the presence of a ketone having the formula R—CO—R$_1$, wherein R is an aliphatic or aromatic radical and R$_1$ is an aliphatic radical or forms with R a cycloalkane radical, said ketone being added in an amount corresponding to at least 0.5 mole per mole of manganic carboxylate to be prepared, and in the presence of said carboxylic acid of which said manganic salt is a derivative, at a temperature from 50 to 130° C.

2. The process of claim 1 wherein the partial pressure of oxygen in the reaction zone is from 0.1 to 50 atmospheres.

3. The process of claim 2 wherein ketone is evolved from the reaction, condensed, and recycled to the reaction zone.

4. The process of claim 1 wherein all of the ketone is added to the reaction mixture at once at the start of the reaction.

5. The process of claim 1 wherein the ketone is one containing no greater than 12 carbon atoms.

6. The process of claim 5 wherein the ketone is acetone and wherein the manganic carboxylate is manganic acetate.

7. The process of claim 1 wherein said carboxylic acid is acetic acid.

8. The process of claim 1 wherein the oxygen containing gas is an oxygen stream.

9. The process of claim 1 wherein the temperature is within the range of 60 to 100° C.

References Cited
UNITED STATES PATENTS 3,637,776  1/1972  Welsh _____ 260—429 R
3,647,835  3/1972  Butter _____ 260—429 R

OTHER REFERENCES

Prengle et al., "Hydrocarbon Processing," 49, March 1970, pp. 107, 108, 114, and 115.

DANIEL E. WYMAN, Primary Examiner
P. F. SHAVER, Assistant Examiner

U.S. Cl. X.R.
260—414, 687